United States Patent [19]

Wakita et al.

[11] Patent Number: 5,307,190
[45] Date of Patent: Apr. 26, 1994

[54] FERROELECTRIC LIQUID CRYSTAL PANEL AND METHOD OF MANUFACTURING SAME

[75] Inventors: Naohide Wakita, Osaka; Tsuyoshi Uemura, Kadoma, both of Japan

[73] Assignee: Matsushita Electric Industrial Co., Ltd., Osaka, Japan

[21] Appl. No.: 931,992

[22] Filed: Aug. 19, 1992

[30] Foreign Application Priority Data

Aug. 19, 1991 [JP] Japan .................................. 3-206698
Jan. 28, 1992 [JP] Japan .................................. 4-012748

[51] Int. Cl.⁵ .............................................. G02F 1/133
[52] U.S. Cl. ........................................ 359/82; 359/46; 359/100
[58] Field of Search ............... 359/42, 46, 82, 100, 359/49

[56] References Cited

U.S. PATENT DOCUMENTS

| | | | |
|---|---|---|---|
| 4,367,924 | 1/1983 | Clark et al. | 359/100 |
| 4,561,724 | 12/1985 | Otaki et al. | 359/82 |
| 4,674,839 | 6/1987 | Tsuboyama et al. | 359/82 |
| 4,682,858 | 7/1987 | Kanbe et al. | 359/100 |
| 5,064,276 | 11/1991 | Endo et al. | 359/49 |

FOREIGN PATENT DOCUMENTS

| | | |
|---|---|---|
| 0435343A2 | 7/1991 | European Pat. Off. . |
| 2569280 | 2/1986 | France . |
| 56-155920 | 12/1981 | Japan . |
| 64-33524 | 2/1989 | Japan . |
| 2-110434 | 4/1990 | Japan . |
| 3-203773 | 9/1991 | Japan . |
| WO90/00264 | 1/1990 | PCT Int'l Appl. . |
| 2180949A | 4/1987 | United Kingdom . |

Primary Examiner—William L. Sikes
Assistant Examiner—Huy Mai
Attorney, Agent, or Firm—Wenderoth, Lind & Ponack

[57] ABSTRACT

A ferroelectric liquid crystal panel includes a first substrate, a second substrate opposed to and spaced from the first substrate, and a ferroelectric liquid crystal interposed between the first and second substrates and having a given layer structure. The second substrate expands and contracts in a direction normal to the layer structure of the liquid crystal according to deformation of the first substrate.

14 Claims, 5 Drawing Sheets

20   21

31

FERROELECTRIC LIQUID CRYSTAL PANEL AND METHOD OF MANUFACTURING SAME

BACKGROUND OF THE INVENTION

1. Field of the Invention

The present invention relates to a ferroelectric liquid crystal panel and a method of manufacturing the same. The present invention relates also to a display device employing the ferroelectric liquid crystal panel.

2. Description of the Prior Art

It is well known that ferroelectric liquid crystals provide a high-speed response in microseconds, because liquid crystal molecules thereof have spontaneous polarization. When the ferroelectric liquid crystals are made thin, they show a memory effect. Because of this, even if the number of display lines is increased, the ferroelectric liquid crystals provide a high contrast display. Furthermore, the ferroelectric liquid crystals are very wide in viewing angle. These superior properties can be realized with a simple matrix panel, which can be readily manufactured at a low cost (see U.S. Pat. No. 4,367,924).

FIG. 1 depicts a molecular orientation of a ferroelectric liquid crystal at the time a ferroelectric liquid crystal panel was made thin. It was confirmed by X-ray diffraction that liquid crystal molecules 20 were aligned parallel to upper and lower substrates by alignment layers formed on respective substrates, and liquid crystal layers 21 were bent between the substrates, as shown in FIG. 1.

Although chiral smectic liquid crystals are generally used as the ferroelectric liquid crystals, the smectic phase has a higher-order orientation than the nematic phase, and smectic liquid crystal molecules tend to orient by forming a layer structure. Due to the higher-order orientation, the smectic liquid crystals provide a high-speed response. When an easy-to-align low molecular ferroelectric liquid crystal panel is subjected to deformation, for example, by a mechanical shock, the molecular orientation and the layer structure thereof fall into disorder, and the memory effect is lost. As a result, no display can be presented on the ferroelectric liquid crystal panel. The disorder of orientation cannot be restored until the ferroelectric liquid crystal experiences processes wherein the temperature thereof is raised to a temperature of the nematic phase or isotropic phase and is subsequently gradually reduced.

Because the layer structure tends to fall into disorder if a cell warps, U.S. Pat. No. 4,674,839 discloses the use of a protection means operable to avoid direct transmission of an external force to the cell to thereby to avoid the possibility of the disorder in the layer structure. In order to prevent the external force from being applied to the cell by the use of the protection means, the cell must be kept out of contact with the protection means. To this end, it is necessary to make the protection means thick and to keep the cell a suitable distance away therefrom. As a result, a display unit becomes considerably thick, and the advantage of the liquid crystal panel is lost.

In U.S. Pat. No. 4,674,839, a flexible substrate is employed as one of substrates so that a liquid crystal layer may be made thin and uniform in thickness. This prior art document teaches that the layer structure is liable to be disordered by warping of the flexible substrate, which may be caused by an impact or the like.

U.S. Pat. No. 4,674,839 teaches a preferred structure wherein the flexible substrate is placed on the display side and a transparent protection means is spaced therefrom. In this structure, another substrate placed on a side opposite to the display side and the protection means are both made thick to restrain warping the cell. As a result, a display unit becomes thick.

Japanese Laid-open Patent Publication No. 3-203773 discloses a liquid crystal panel having an air damper. The air damper is formed by a closed space defined by a cell and a support member. The provision of the air damper is based on the fact that the protection means is not so effective against a mechanical shock caused by inertia, which would be produced, for example, by spontaneous falling of the cell. As is the case with the protection means, the provision of the air damper also makes a display unit thick. In addition, the structure becomes complicated, thus increasing the cost of manufacture.

Japanese Laid-open Patent Publication No. 64-33524 discloses a method of bonding upper and lower substrates via spacers to rigidify a cell itself. Although this method can enhance resistance to impact shock to some extent, it is necessary to inject a liquid crystal into a space defined between the upper and lower substrates after both the substrates have been bonded. Because ferroelectric liquid crystals are generally very high in viscosity, and the spacing between the substrates is extremely narrow, it is very difficult to uniformly inject a liquid crystal into a large cell.

According to experiments conducted by the inventors of the instant application, when two generally available panels each having a thickness of 1.1 mm or 0.7 mm were bonded, the strength thereof was approximately three times greater than the case where these panels were not bonded. However, when the panel surface was depressed somewhat strongly by a finger, an uneven display occurred.

U.S. Pat. No. 4,682,858 teaches making a liquid crystal layer thin and unifying the thickness thereof using a flexible substrate as one of two substrates. In general, the thickness of the liquid crystal layer showing the memory effect ranges from 1 $\mu$m to 2 $\mu$m. This range in thickness is appropriate to obtain a desired memory effect and also to approximate the color produced by birefringence effect to water-whiteness. According to this disclosure, because the liquid crystal layer is thin and has a small tolerance of, for example, 0.1 $\mu$m in thickness, as compared with conventional TN (Twisted Nematic) type liquid crystals, if a cell is defined by generally available glass plates, it is impossible to uniformly form the thin liquid crystal layer therein. Accordingly, this disclosure teaches placing the flexible substrate in accord with undulation of another thin substrate made of glass or plastic film to prevent unevenness in thickness of the liquid crystal layer. According to this disclosure, after the two substrates have been bonded via spacers, the cell is evacuated to allow the liquid crystal to be injected thereinto through an injection hole. During the injection, however, because the cell is subjected to a pressure difference of approximately 1 atm between the inside and the outside thereof, the spacers cut into the plastic film, thus considerably narrowing the distance between the two substrates. As a result, it is extremely difficult to inject the liquid crystal into the cell.

According to this disclosure, supposing that the flexible substrate is an elastic plate which is carried by two spaced supports and which is subjected to deformation under the influence of an external force, the deformation of the flexible substrate is expressed by a formula. Based on this formula, the distance between the spacers is determined. In the case of a plastic substrate, however, the spacers are likely to cut thereinto. In particular, of generally available spherical spacers, hard ones cut into the substrate with ease. Accordingly, the aforementioned formula indicative of elastic deformation is not applicable to such a case. Even in the case of a glass substrate, because the spacers are likely to cut thereinto according to the relationship between the hardness thereof and that of electrodes, insulating layers, and alignment layers on the substrate, the aforementioned formula is not applicable to this case also. Furthermore, the provision of a reduced pressure space inside the cell reduces the volume of the liquid crystal at low temperatures, thereby enlarging a vacant internal space. This space occasionally appears on the display or slightly remains even if the temperature of the cell is returned to normal temperature. In some cases, a defect of molecular orientation would occur.

Although glass is generally used for substrates of a liquid crystal panel, Japanese Laid-open Patent Publication Nos. 56-155920 and 64-33524 disclose the use of plastic films for the substrates to make them thin. According to these disclosures, transparent electrodes of, for example, indium tin oxide are initially mounted on a transparent plastic resin film of, for example, polyether sulfon, polycarbonate, polyethylene terephthalate, or the like. Then, an alignment layer is coated on the plastic resin film, and liquid crystal is appropriately oriented through a rubbing treatment. In Japanese Laid-open Patent Publication No. 64-33524, a cell is fabricated by bonding upper and lower substrates to each other via spacers coated with an adhesive. Thereafter, a ferroelectric liquid crystal is injected into the cell.

SUMMARY OF THE INVENTION

The present invention has been developed to overcome the above-described disadvantages.

It is accordingly an object of the present invention to provide an improved ferroelectric liquid crystal panel which is free from disorder of orientation even if the panel is subjected to a mechanical shock or a pressure.

Another object of the present invention is to provide a ferroelectric liquid crystal panel of the abovedescribed type which has a simple construction and is functionally stable and which can be readily manufactured at a low cost.

A further object of the present invention is to provide a method of manufacturing the ferroelectric liquid crystal panel, whereby a ferroelectric liquid crystal can be easily injected into a space defined between two substrates, even if the space is narrow.

In accomplishing the above and other objects, a ferroelectric liquid crystal panel according to the present invention comprises a first substrate, a second substrate opposed to and spaced from the first substrate, and a ferroelectric liquid crystal interposed between the first and second substrates and having a given layer structure. The material and thickness of the second substrate are appropriately selected so that the second substrate may expand and contract in a direction normal to the layer structure of the liquid crystal according to deformation of the first substrate.

A mechanism wherein the layer structure falls into disorder by the deformation of the panel has hitherto been unknown. Inventors of the instant application analyzed the correlation between the deformation of the panel caused, for example, by depression and locations where an uneven display occurs through computer simulations and experiments, and finally ascertained that the major cause of disorder of orientation was a deviation or shearing between substrate surfaces sandwiching a liquid crystal.

Even if the panel is subjected to deformation by a mechanical shock or the like, the above construction restrains the deviation between the substrate surfaces and causes no disorder of orientation. This panel does not require any protection means or damper for restraining the deformation of the panel and can make a display unit thin, unlike the conventional panels.

When a pressure less than a given value is applied to the liquid crystal panel, a maximum deviation between the substrate surfaces is preferably limited to be less than 0.6 micron in the direction normal to the layer structure.

In another aspect of the present invention, a display unit having a ferroelectric liquid crystal panel comprises a first plastic resin film substrate, a second plastic resin film substrate opposed to and spaced from the first substrate, a ferroelectric liquid crystal interposed between the first and second substrates and having a given layer structure, and a pair of protection members disposed in front of and behind the liquid crystal panel, respectively, for protecting the liquid crystal panel. When a pressure less than a given value is applied to the liquid crystal panel, the protection members protect the liquid crystal panel from being bent to an extent of exceeding a given curvature, thereby limiting a maximum deviation between a first substrate surface and a second substrate surface to be less than 0.6 micron in the direction normal to the layer structure.

In a further aspect of the present invention, a display unit having a liquid crystal panel comprises a first glass substrate, a second plastic resin film substrate opposed to and spaced from the first substrate, a plurality of electrodes formed on an internal surface of the first substrate, a plurality of electrodes formed on an internal surface of the second substrate, and a liquid crystal interposed between the first and second substrates, thereby providing a display on a side of the first substrate.

In another aspect of the present invention, a method of manufacturing a liquid crystal panel having first and second substrates, at least one of which comprises a plastic resin film, comprises the steps of coating a ultraviolet-curable sealant on a peripheral portion of at least one of the substrates so that the sealant encircles a display region, uniformly distributing a given amount of a liquid crystal over the second substrate, bonding and pressing the substrates in a vacuum chamber, and applying ultraviolet rays to the sealant, thereby hardening the sealant.

Because the method comprising the above steps facilitates the injection of a ferroelectric liquid crystal into a space defined between two substrates even if the distance between the two substrates is short, this method is particularly suited for use in manufacturing large-sized panels or ferroelectric liquid crystal panels wherein the distance between the two substrates is relatively short.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
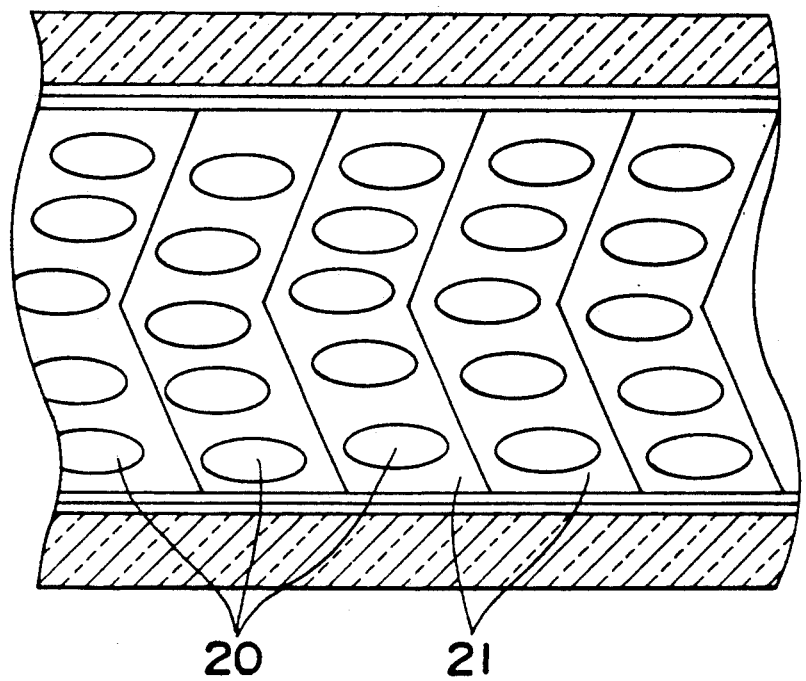
FIG. 1 is a sectional view of a conventional ferroelectric liquid crystal panel, illustrating a molecular orientation.
Figure 2:
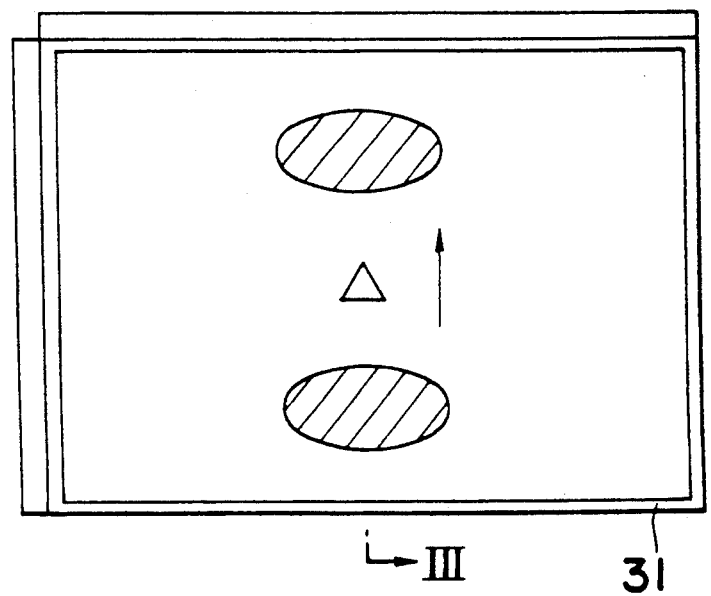
FIG. 2 is a top plan view of the conventional ferroelectric liquid crystal panel, illustrating poorly oriented portions.

Referring now to the drawings, there is shown in FIG. 2 a ferroelectric liquid crystal panel having conventional glass substrates. While peripheral edges of the panel were supported by any suitable means, a pressure of 0.5 kg/cm$^2$ was applied to a central portion shown by $\Delta$. In FIG. 2, poorly oriented portions are indicated by oblique lines, whereas a direction normal to liquid crystal layers is indicated by an arrow. In another panel wherein the direction normal to the layers was changed by changing the direction of rubbing, it was confirmed that the poorly oriented portions were shifted and appeared on respective sides of the pressure receiving portion with respect to the direction normal to the layers. Because the thickness of a cell should change most largely at the pressure receiving portion, poor orientation is considered not to be caused by the changes in thickness of the cell.

A simulation analysis was made to investigate deformation of the panel using the finite element method. As a result, it was confirmed that the poorly oriented portions were in complete agreement with those surface portions of upper and lower substrates that deviate relative to each other in the direction normal to the layers and parallel to the substrates. The presence of deviation or shearing (poor orientation) on respective sides of the pressure receiving portion (between the pressure receiving portion and panel ends) is due to the fact that the panel ends are fixed by a sealant.

Figure 3:
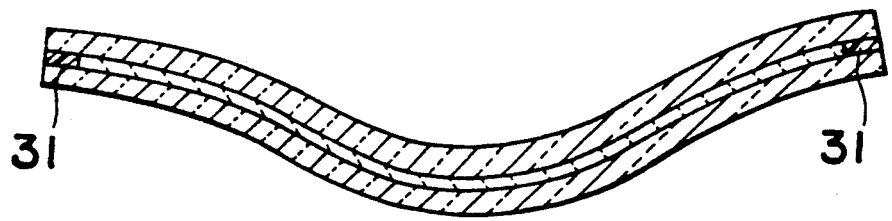
FIG. 3 is a sectional view taken along line III—III in FIG. 2.

FIG. 3 depicts a deformation of the panel at the time a pressure was applied thereto. Because the two substrates have a constant length and the panel ends are almost fixed by a sealant 31, undulation of a curved surface at the panel ends is the opposite of that of the curved surface at the central portion. Because of this, the deviation is maximized at locations between the panel ends and the pressure receiving portion. That component of the deviation which is parallel to the layer exerts no influence on molecular orientation. The reason for this is that, in the chiral smectic C phase, although the direction of liquid crystal molecules within the layers is determined, because the position thereof is random, the deviation in the direction parallel to the layers causes no changes in molecular orientation order.

Figure 4:
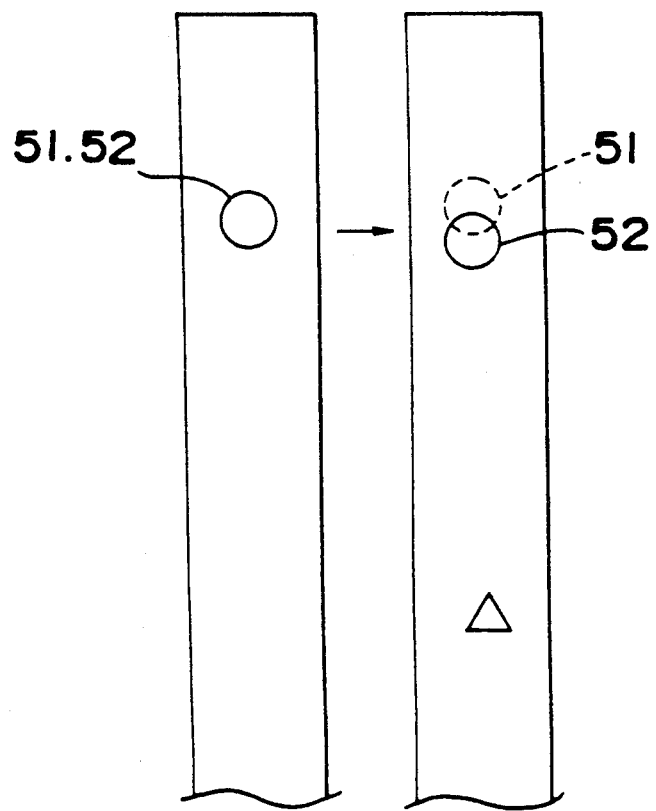
FIG. 4 is a top plan view of part of a substrate surface, on an enlarged scale, illustrating that, upon application of a pressure to the conventional ferroelectric liquid crystal panel, two holes respectively formed in upper and lower substrates deviate from each other.

It was confirmed that the poor orientation did not occur until the deviation between the upper and lower substrates in the direction normal to the layers exceeded approximately 0.3 micron. If the deviation was below 0.6 micron, the molecular orientation could be restored by applying an alternating voltage of 30 V at 10 Hz. It was also confirmed by an experiment that the deviation was a major cause of the poor orientation. Before the panel was subjected to deformation, transparent electrodes formed on the upper and lower substrates were marked with holes 51 and 52, respectively, which were formed at one of the locations shown by the oblique lines in FIG. 2 by spot-applying a laser thereto. Upon depression of the panel at the central portion thereof, it was confirmed by the use of a microscope that the holes 51 and 52 deviated from each other, as shown in FIG. 4. The deviation of the holes 51 and 52 indicates that the upper and lower substrates deviated from each other.

Also in the case where a mechanical shock was applied to the panel, for example, by dropping the panel, the poor orientation occurred at the same or nearly the same locations as in the case where a pressure was applied. It is conceivable that the panel was subjected to deformation by the action of an inertia force, thus causing a deviation of the substrates, as in the case where a pressure was applied.

Let it be assumed that the panel is bent and one of the substrates forms a curved surface having a curvature radius of r. In this case, because the other substrate is spaced d (thickness of the liquid crystal layers) from said one substrate, the former must form a curved surface having a curvature radius of (r+d) parallel to the curved surface of the latter. If the curvature radii differ, the length of an arc defined by a given angle $\theta$ differs at the curvature radii of r and (r+d). Accordingly, when the length of the substrates is constant as is the case with glass substrates, a deviation inevitably occurs.

In view of the above, a ferroelectric liquid crystal panel according to the present invention is provided with a flexible plastic substrate as at least one of the two substrates. The plastic substrate employed in the present invention has a small resistance to stretching and can readily expand and contract. The inventors of the instant application discovered that the use of such a flexible substrate can eliminate the occurrence of a deviation between the two substrates, which has hitherto been caused by the deformation of the panel. This is a discovery overturning conventional common sense wherein disorder of orientation, which would be caused by a mechanical shock or the like, can be restrained by making the panel resistant to being bent, for example, by thickening the substrates or by bonding them.

Figure 5:
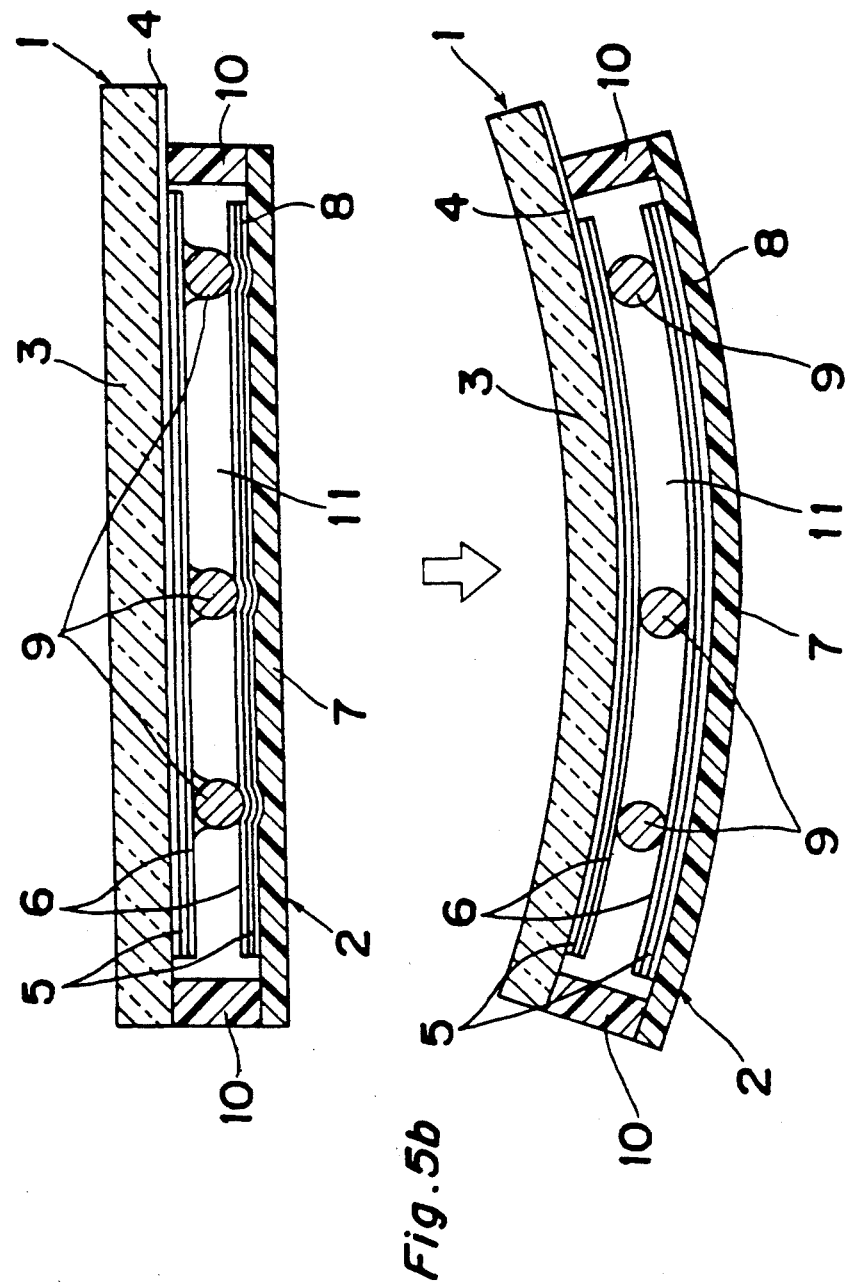
FIG. 5a is a sectional view of a ferroelectric liquid crystal panel according to the present invention.
FIG. 5b is a view similar to FIG. 5a, particularly illustrating a deformation of the ferroelectric liquid crystal panel at the time a pressure is applied thereto.

FIG. 5a depicts a ferroelectric liquid crystal panel according to the present invention, which comprises an upper substrate 1 and a lower substrate 2 opposed to the upper substrate 1. The upper substrate 1 comprises a glass plate 3, a plurality of transparent electrodes 4 formed on the glass plate 3, an insulating layer 5 formed on the electrode 4, and an alignment layer 6 formed on the insulating layer 5. On the other hand, the lower substrate 2 comprises a plastic resin film 7 made of polyether sulfon and having a thickness of 0.1 mm, a plurality of transparent electrodes 8 formed on the plastic resin film 7, an insulating layer 5 formed on the electrode 8, and an alignment layer 6 formed on the insulating layer 5. The alignment layers 6 are formed by coating serum albumin on the insulating layer 5 but may be thin layers of silane coupler or polyimide.

Figure 6:
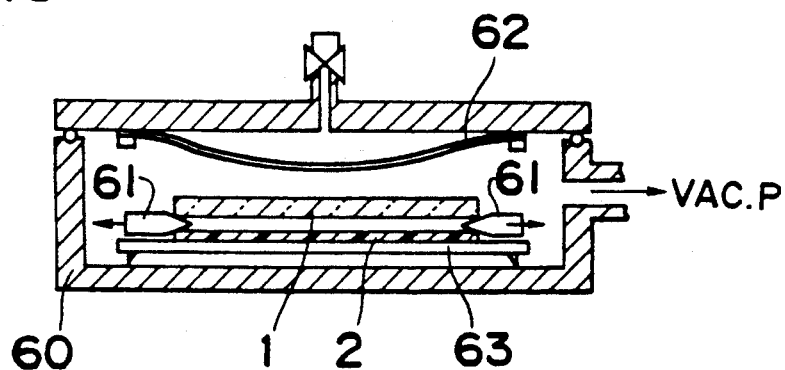
FIG. 6 is a sectional view of an apparatus for effecting a method according to the present invention.

In fabricating the ferroelectric liquid crystal panel, a UV (ultraviolet)-curable sealant 10 is initially coated on all peripheral edges of the lower substrate 2, and a liquid crystal 11 is caused to drip thereon. Then, a large number of spherical spacer 9 of silicon dioxide coated with thermoplastic epoxy resin and having a diameter of 1.8 $\mu$m are appropriately scattered on the alignment layer 6. Thereafter, the upper substrate 1 is heated at 110° C. for twenty minutes to melt the epoxy resin, thereby anchoring the spacers 9 on the upper substrate 1. Then, the upper and lower substrates 1 and 2 are accommodated in a vacuum chamber 60 and are placed in position on a positioning platform 63, as shown in FIG. 6. At this moment, the peripheral edges of the upper substrate 1 and those of the lower substrate 2 are regularly spaced by wedges 61. After the vacuum chamber 60 has been evacuated, the wedges 61 are removed so that the two substrates 1 and 2 may be bonded to each other. Then, air is introduced into a balloon 62 disposed above the substrates 1 and 2 and inflates it to press the upper surface of the upper substrate 1 radially outwardly from the center thereof. The inflated balloon 62 spreads the sealant 10, thereby sealing the liquid crystal. Preferably, the balloon 62 is made of a urethane rubber sheet. Thereafter, the panel is taken out of the vacuum chamber 60, and ultraviolet rays are applied only to the sealant 10 for the curing thereof In this way, the fabrication is completed.

The quantity of drips of the liquid crystal is rendered to be substantially equal to a volume obtained by multiplying an inner area of the spread sealant 10 by the (spacer diameter 0.05 $\mu$m). Because of this, the internal pressure of the panel is generally less than the atmospheric pressure. Accordingly, the upper and lower substrates 1 and 2 are pressed inwardly by a pressure difference between the inside and the outside of the panel, even if the two substrates are not bonded via spacers with an adhesive, unlike the conventional panel. By this construction, the film substrate 2 can easily expand or contract according to deformation of the glass substrate 1 irrespective of the manner in which the panel deforms, thereby restraining the occurrence of a deviation between the two substrates 1 and 2.

Japanese Laid-open Patent Publication No. 56-155920 discloses that while a portion of a closed UV-curable sealant is kept uncured, a liquid crystal is caused to drip on a lower substrate, to which an upper substrate is bonded. According to this disclosure, any excess liquid crystal is expelled through the uncured portion of the sealant by inwardly pressing the two substrates. The method as mentioned in this disclosure, however, cannot maintain a space defined between the two substrates under reduced pressure. Furthermore, air tends to remain and turn into bubbles.

In this embodiment, the quantity of the liquid crystal is reduced 2.7% from the volume determined by the spacer diameter. It was, however, confirmed that a desired effect could also be obtained by a reduction of 1%.

The manufacture of the conventional panels of which upper and lower substrates are bonded need the use of the vacuum injection method wherein a liquid crystal is injected after an empty cell has been fabricated. If the bonding is performed after dripping the liquid crystal, because the liquid crystal enters between spacers and the substrates, the two substrates cannot be bonded even by heating. Some components of an adhesive seep into the liquid crystal and lower the properties thereof. In the conventional vacuum injection method, after an empty cell has initially been evacuated, an injection hole is plugged by a liquid crystal, and the external pressure of the empty cell is restored to the atmospheric pressure so that the liquid crystal may be injected thereinto by a pressure difference between the outside and the inside thereof. Because of this, the spacers inevitably cut into a resin film. As a result, the distance between the two substrates becomes narrow, as compared with the case wherein two glass substrates are employed. Furthermore, it is difficult to inject the liquid crystal into the cell and to fabricate the cell into a target thickness. Particularly, because ferroelectric liquid crystals are high in viscosity and the distance between two substrates is generally narrow in ferroelectric liquid crystal panels, it is very difficult to inject a liquid crystal into a space defined between the two substrates. In panels having a relatively wide area, there are many cases where the liquid crystal cannot be completely injected thereinto. In order to reduce the viscosity, if the temperature is raised from the smectic phase, which is the ferroelectric liquid crystal phase, to the nematic phase or the isotropic phase, the panels are likely to expand, because the substrates generally have a large coefficient of linear expansion, which is four to ten times greater than that of soda glass.

Furthermore, due to an electric field caused by spontaneous polarization, the ferroelectric liquid crystals are likely to be subjected to the so-called "sticking" or "burning", wherein impure ions are polarized and a display cannot easily change. The inventors of the instant application prevent the "sticking" by adding a slight amount of amine to the liquid crystals, as disclosed in Japanese Laid-open Patent Publication No. 2-110434. Although it is known that amine has an antistatic effect, any other suitable antistatic agent may be added to the liquid crystals. In addition, there is a report stating that the properties of the liquid crystals can be improved by adding charge-transfer complexes thereinto (See pages 286-287 of "a collection of lectures in 15th forum for liquid crystals" edited by Chou et al). In the conventional vacuum injection method, these additives tend to be collected near an injection hole, and as the additives enter a cell, the concentration thereof becomes lower. Accordingly, not only the effect of preventing the "sticking" is lost, but also a considerably uneven display is caused. Because of this, if an additive is added to a liquid crystal, it is impossible to manufacture uniform panels without using the method according to the present invention. Preferably, the liquid crystal is caused to drip at a number of generally regularly spaced locations inside the panels.

In the method according to the present invention, drops of the liquid crystal spread when a pressure is applied thereto. Accordingly, if spacers are not appropriately anchored, they are forced to flow, thereby causing unevenness in spacer density. Because the resin film is low in rigidity the cell thickness tends to become thin at that portion of the cell where the spacer density is low, however small the area is. Accordingly, the spacers should be bonded to either the upper or the lower substrate. In the method according to the present invention, the standard deviation of the spacers used was 0.03 micron. Although this value is very small, because the resin film is soft, a sufficiently uniform pressure could be applied to the cell when the scattering density of the spacers was greater than 300 pieces/mm². If the scattering density is too high, the spacers tend to be collected. Accordingly, a scattering density of 2000 pieces/mm² is deemed to be the upper limit.

In this embodiment, one of the two substrates is made of glass, whereas the other is of a film structure. However, if the film substrate is used as the upper substrate, it is bent downwardly and is brought into contact with the lower substrate during the positioning thereof. Accordingly, the film substrate should be used as the lower substrate. Furthermore, a pressure should be gradually applied to the upper substrate radially outwardly from the center thereof by the use of an elastic member which protrudes downwardly. The rubber balloon 62 shown in FIG. 6 is considered to be one preferred elastic member. If a pressure is applied to the entire upper surface of the upper substrate at the same time, a strain concentrates on part of the film, thereby producing wrinkles. Also, if the film substrate is secured on a supporting or positioning platform in a chamber by means of static electricity or a vacuum chuck, the positioning thereof is facilitated.

In the above-described embodiment, although a ferroelectric liquid crystal is interposed between the two substrates, substantially the same effect can be obtained even by the use of a nematic liquid crystal. Accordingly, what is interposed between the substrates is not limited to the ferroelectric liquid crystal. However, the method according to the present invention can be clearly distinguished from the conventional method, particularly in ferroelectric liquid crystal panels wherein the distance between the substrates is relatively short. Of the ferroelectric liquid crystal panels, those having a cell thickness less than 3 microns are low in colorability and are further advantageous for the method according to the present invention.

Upon supporting peripheral portions of a panel according to the present invention, when a pressure of 3 kg/cm² was applied to the glass substrate at a central portion thereof, no disorder of orientation occurred. Even in a drop test, no disorder of orientation occurred until the panel broke. As to the display, only when the pressure was being applied, the memory effect become worse at the pressure receiving portion. However, the memory effect was restored at the time the pressure was removed, and it became possible to perform a matrix-driving with respect to the panel.

An experiment such as shown in FIG. 3 was made with respect to the panel according to the present invention. As a result of the experiment, no deviation could be discovered. It is conceivable from this experiment that, when the upper substrate was subjected to deformation by receiving an external pressure, the lower substrate i.e., the film substrate expanded as a whole, and no deviation was produced between the upper and lower substrate surfaces throughout the panel. When a mechanical shock was applied to the panel, for example, by dropping it, the panel was deformed into the opposite of the shape shown in FIG. 5b. In this case also, no disorder of orientation occurred. Accordingly, it is conceivable from this fact that the film substrate contracted slightly.

The use of a film having a thickness less than 0.3 mm was more effective. The reason for this is that as the thickness of a plastic resin increases, it becomes resistant to being expanded or contracted. The tensile modulus of elasticity of the film used in the experiment shown in FIGS. 5a and 5b is 24,600 kg/cm², and therefore, the product of the tensile modulus of elasticity and the thickness is less than approximately 750 kg/cm. If a resin having a large tensile modulus of elasticity is used as a material of the film substrate, the film substrate can be made more elastic by making it thinner. Accordingly, the material of plastic resin is not limited to that mentioned previously. Furthermore, if the glass substrate is made thick, the panel becomes resistant to being bent. If the panel is subjected to a load greater than its bending strength, the glass is broken before disorder of orientation occurs.

When the film thickness and the glass thickness were less than 0.3 mm and greater than 0.55 mm, respectively, no poor orientation occurred until the panel was broken. If the panel size is very large, even when the deflection of the panel is small, the deviation between the two substrates becomes large. Accordingly, it is necessary to restrict the panel deformation, for example, by installing a protection member in front of the panel to prevent an external force from deforming the panel excessively. Unlike the conventional case, however, even if the external force is directly transmitted to the panel, there arises no problem unless the curvature of the panel deformed by the external force causes a deviation greater than 0.6 $\mu$m between the two substrates. It is, therefore, possible to make the protection member considerably thin.

Although plastic resin films are preferably used as a material of a flexible substrate, a very thin glass substrate can also be used because it would cause only a relatively small deviation between the substrates. In a ferroelectric liquid crystal panel wherein each of two glass substrates have a diagonal line of 9 inches and a thickness of 1.1 mm, when a load of 0.55 kg was applied to a central portion thereof, disorder of orientation occurred. When the thickness of one of the two glass substrates was 0.3 mm, the panel resisted a load less than 0.75 kg. As a result of a calculation wherein the amount of deflection at the center of the panel was estimated based on the panel rigidity (proportional to the cube of the thickness), it was confirmed that a panel comprised of two glass substrates having thicknesses of 0.3 mm and 1.1 mm, respectively, could resist a deformation 5.3 times greater than a deformation which a panel comprised of two glass substrates each having a thickness of 1.1 mm could resist. If the glass thickness is further reduced to 0.1 mm and to 0.05 mm, orientation can be maintained even if the panel is subjected to a larger deformation. The panel can be made resistant to being bent either by reducing the thickness of one substrate to 0.3 mm or to 0.1 mm and increasing that of the other substrate to 1.1 mm or more, or by superimposing a protection plate on the panel. By doing so, the resistance to impact shock of ferroelectric liquid crystal panels comprised of two glass substrates can also be enhanced.

Figure 7:
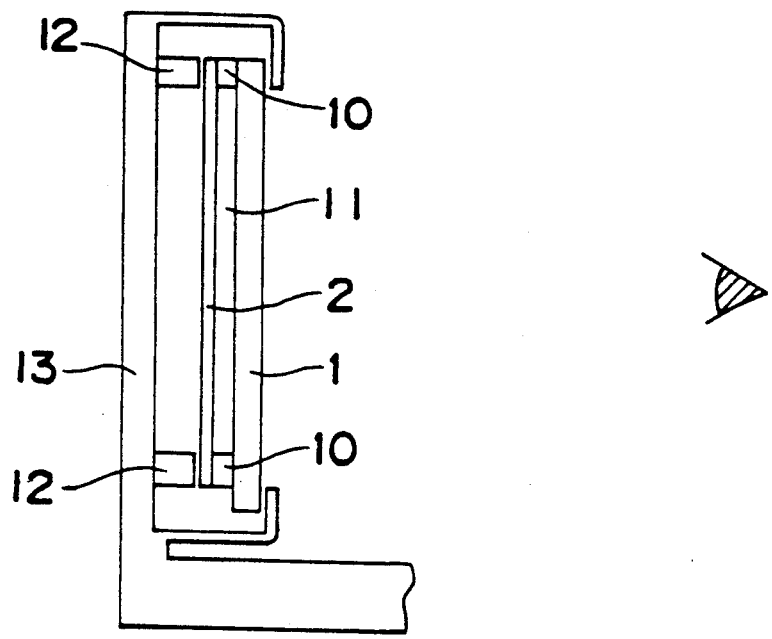
FIG. 7 is a side view of a display unit according to the present invention.

When the panel shown in FIG. 5a was depressed by a finger from the film substrate side, the orientation at the pressure receiving portion fell into disorder and could not be restored. In view of this fact, a display unit shown in FIG. 7 comprises a frame 13, a film substrate 2 securely mounted in the frame 13 via support members 12, and a glass substrate 1 bonded to the film substrate 2 via a sealant 10. In use, the glass substrate 1 is directed to an observer so that no disorder of orientation would be caused even if the panel is depressed by a finger of the observer. The support members 12 are preferably made of rubber, plastic or the like, and are in abutment with peripheral portions of the rear surface of the panel. Because a space is defined between the frame 13 and the rear surface of the panel, the film substrate 2 is not brought into contact with the frame 13 even if the panel is depressed. Accordingly, the entire film substrate 2 is subjected to no external pressure. This structure provides a thin and light display unit and causes no disorder of orientation even if an external pressure is applied to the panel surface. Also, this structure can realize a peninput wherein an input is performed by touching the liquid crystal surface with the use of a pen.

In conventional thin word processors or the like, a substantially flat light guide acrylic plate is generally placed behind a liquid crystal panel, and at least one fluorescent lamp is disposed in the proximity of one end of the light guide plate.

Figure 8:
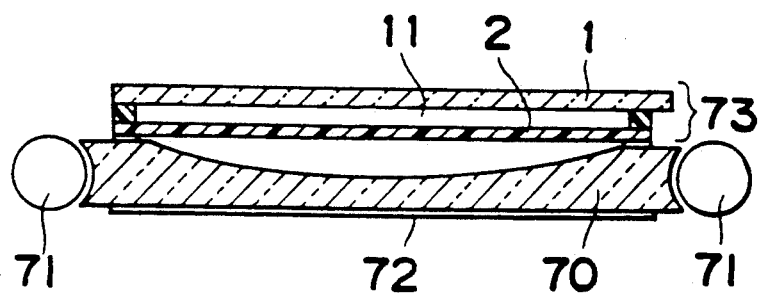
FIG. 8 is a sectional view of a modification of the display unit.

FIG. 8 depicts a display unit according to the present invention, which comprises a liquid crystal panel 73, a light guide plate 70 disposed behind the panel 73, and two fluorescent lamps 71 disposed on respective sides of the light guide plate 70. The light guide plate 70 has a concave surface on the side of the panel to provide a space behind the panel. Lights emitted from the fluorescent lamps 71 are transmitted through the surface of the light guide plate 70. The lights are then diffused by a diffusion layer 72 formed on the rear surface of the light guide plate 70 and are applied to the panel 73. In the display unit having this structure, even if the light guide plate 70 is thin, a space can be formed behind the panel.

Figure 9:
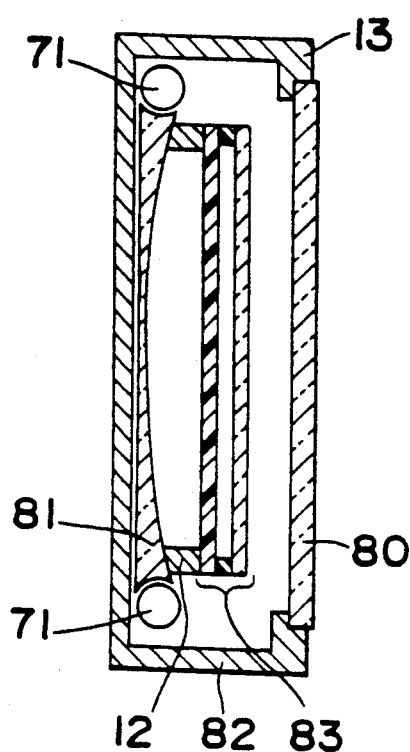
FIG. 9 is a sectional view of another modification of the display unit.

When a plastic film substrate was used as the upper substrate 1, no disorder of orientation was caused even if a panel of 18×25 cm was bent such that the curvature radius was rendered to be approximately 10 cm. However, it is likely that only a small external force would cause a relatively large deformation. Because of this, a panel 83 shown in FIG. 9 is accommodated in a frame 82 and is provided with a protection cover 80 and a protection member 81 disposed in front of and behind the panel, respectively, thereby preventing the panel from being bent more than an allowable curvature. Preferably, both the protection cover 80 and the protection member 81 are made of glass or plastic. Although the protection cover 80 must be a transparent plate, the protection member 81 is not limited to the light guide plate 70 as shown in FIG. 8. In the case of a direct type lighting, the protection member 81 is a diffusion plate. In the case of a reflection type lighting, the protection member 81 is the frame itself. In any case, it is necessary to support peripheral portions of the panel to space the panel from both or one of the protection cover 80 and the protection member 81 so that no pressure would be applied to any portion of the panel.

According to measurements performed by inventors of the instant application, the load at the time the panel is strongly depressed by a finger is approximately 2.5 kg. Accordingly, the panel must resist this load at a minimum.

Figure 10:
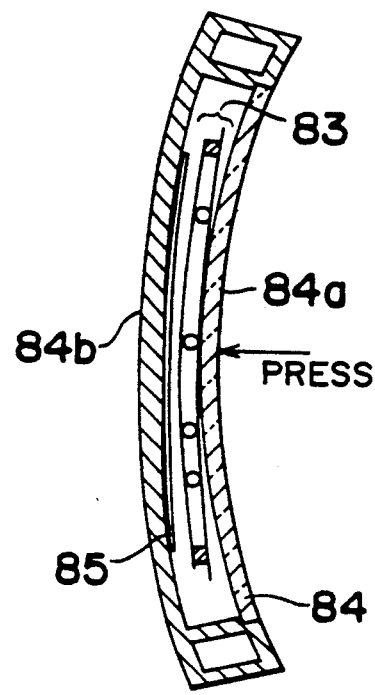
FIG. 10 is a sectional view of a further modification of the display unit.

In a display unit shown in FIG. 10, opposite side portions of a casing 84 accommodating a liquid crystal panel 83 are rigidified so that two plate members 84a and 84b disposed in front of and behind the panel 83, respectively, may be bent or deformed generally in parallel with each other when a pressure is applied to a central portion of the display unit in a direction shown by an arrow. In this case, even if the display unit is made thin, it is unlikely that the panel would be sandwiched between the two plate members under pressure. In FIG. 10, reference numeral 85 denotes a reflector.

Panels of a type wherein a nematic liquid crystal is interposed between two substrates are subjected to no poor orientation. However, as is the case with STN (Super Twisted Nematic) cells wherein the driving voltage is high, when a panel is sandwiched between two plate members placed in front of and behind the panel, respectively, under pressure, spacers cut into the substrates, thus considerably narrowing the distance between the two substrates. As a result, there arises a problem in that a short circuit occasionally occurs between upper and lower electrodes, thereby causing a line defect. Although some of conventional glass panels had protection plates, if one of the protection plates was depressed by a finger, the panel was sandwiched therebetween under pressure. Furthermore, because nematic liquid crystal panels employing a film were of the conventional TN type, the voltage was low, and therefore they were rarely subjected to the aforementioned problem. However, as is the case with the STN type, in applications where a high-voltage driving, particularly a highly multiplexing driving, is performed at a high duty over 1/200 duty, the voltage exceeds 25 volts. Accordingly, it is desirable to space a panel from front and rear plate members such that the panel would not be sandwiched between the plate members under pressure, even if the panel is depressed strongly, as in the ferroelectric liquid crystal panels.

Figure 11:
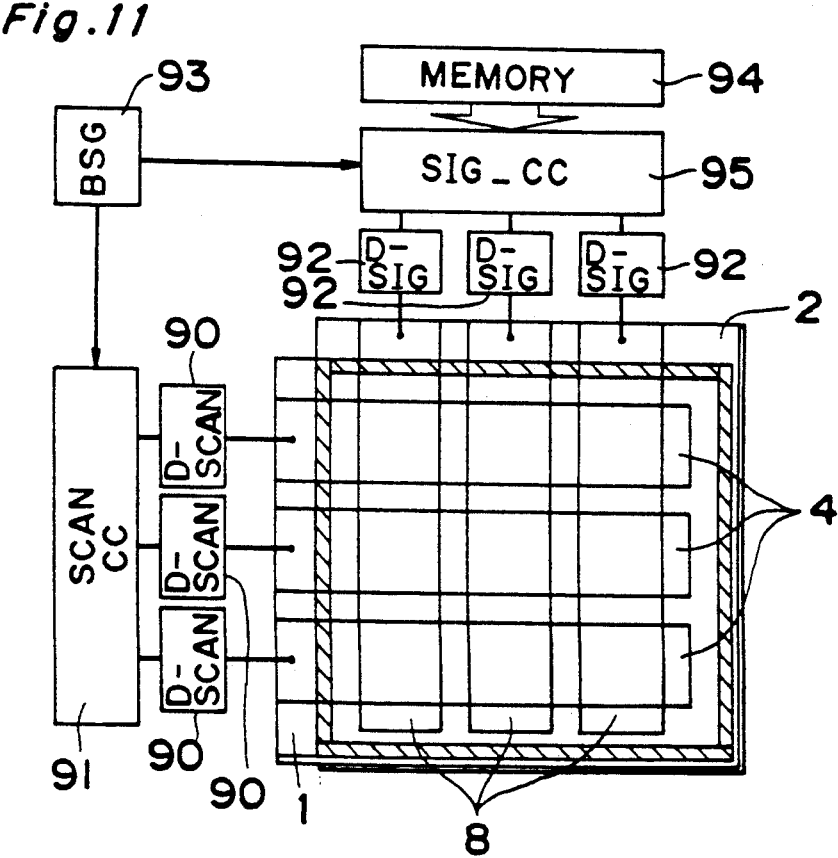
FIG. 11 is a block diagram of a driving circuit for driving the display unit.

FIG. 11 depicts a driving circuit for driving a liquid crystal display unit according to the present invention. As shown in FIG. 11, the driving circuit has a plurality of row electrodes 4 and a plurality of column electrodes 8 extending in a direction substantially normal to the direction in which the row electrodes 4 extend. The row electrodes 4 are connected with respective driver LSIs 90, whereas the column electrodes 8 are connected with respective driver LSIs 92. The driver LSIs 90 are connected with a scanning signal control circuit 91, which sends scanning signals to the driver LSIs 90 to successively apply selection signals to the row electrodes 4. Signal voltages associated with the contents of a display memory 94 corresponding to selected rows are applied from the driver LSIs 92 to the column electrodes 8 via a signal voltage control circuit 95 in synchronism with the scanning signals by the operation of a base signal generating circuit 93. In the selected row electrodes, selected pixels are rendered to be white, whereas non-selected pixels are rendered to be black. When the row electrodes are not selected, only a voltage less than a threshold voltage is applied thereto. The row electrodes are retained by the memory effect of a ferroelectric liquid crystal until they are subsequently selected.

As described hereinabove, because the ferroelectric liquid crystal panel according to the present invention has at least one elastic substrate which can expand and contract in a direction longitudinally thereof, even if the panel is subjected to deformation, little deviation is caused between upper and lower substrate surfaces. Accordingly, the present invention can solve the problems inherent in the conventional ferroelectric liquid crystal panels wherein a mechanical shock or depression occasionally causes poor orientation or renders a display to be partially inoperative.

Moreover, according to the present invention, the method of manufacturing liquid crystal panels facilitates a process for injecting a liquid crystal into a liquid crystal panel having a plastic film substrate and can make all the panels substantially uniform.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A ferroelectric liquid crystal panel comprising:
   a first substrate having a first substrate surface;
   a second substrate having a second substrate surface opposed to and spaced from said first substrate; and
   a ferroelectric liquid crystal interposed between said first and second substrates and having a given layer structure,
   wherein said second substrate expands and contracts in a direction normal to said layer structure of said liquid crystal according to deformation of said substrate, and wherein when a pressure of a value corresponding to the pressure applied to said liquid crystal panel during normal use is applied to said liquid crystal panel, a maximum deviation between said first substrate surface and said second substrate surface is less than 0.6 microns in said direction.

2. The ferroelectric liquid crystal panel according to claim 1, wherein a product of a tensile modulus of elasticity in said direction and a thickness of said second substrate is less than 750 kg/cm.

3. The ferroelectric liquid crystal panel according to claim 2, wherein first and second substrate is made of glass and said second substrate is made of plastic resin.

4. The ferroelectric liquid crystal panel according to claim 3, wherein said fist and second substrates have a thickness greater than 0.55 mm and a thickness less than 0.3 mm, respectively.

5. A display unit having a ferroelectric liquid crystal panel, which comprises:
   a first plastic resin film substrate;
   a second plastic resin film substrate opposed to and spaced from said first substrate;
   a ferroelectric liquid crystal interposed between said first and second substrates and having a given layer structure; and
   a pair of protection members disposed in front of and behind said liquid crystal panel, respectively, for protecting said liquid crystal panel,
   wherein a product of a tensile modulus of elasticity of said second substrate in a direction normal to said layer structure of said liquid crystal and a thickness of said second substrate is less than 750 kg/cm,
   wherein said second substrate expands and contracts in said direction according to deformation of said first substrate, and
   wherein when a pressure less than a given value is applied to said liquid crystal panel, said protection members protect said liquid crystal panel from being bent to an extent of exceeding a given curvature, thereby limiting a maximum deviation between a first substrate surface and a second substrate surface to be less than 0.6 micron in said direction.

6. A display unit having a liquid crystal panel, which comprises:
   a first glass substrate;
   a second plastic resin film substrate opposed to and spaced from said first substrate;
   a plurality of electrodes formed on an internal surface of said first substrate;
   a plurality of electrodes formed on an internal surface of said second substrate;
   a liquid crystal interposed between said first and second substrates, thereby providing a display on a side of said first substrate; and
   a frame for supporting said liquid crystal panel at a peripheral portion thereof, wherein a space is defined between said frame and said second substrate;
   wherein said liquid crystal panel comprises a ferroelectric liquid crystal panel and wherein a product of a tensile modulus of elasticity of said second substrate in a direction normal to a layer structure of said liquid crystal and a thickness of said second substrate is less than 750 kg/cm.

7. A method of manufacturing a liquid crystal panel having first and second substrates, at least one of which comprises a plastic resin film, said method comprising the steps of:
   coating an ultraviolet-curable sealant on a peripheral portion of at least one of said substrates so that said sealant encircles a display region;
   uniformly distributing a given amount of a liquid crystal over said second substrate;
   bonding and pressing said substrates in a vacuum chamber; and
   applying ultraviolet rays to said sealant, thereby hardening said sealant.

8. The method according to claim 7, further comprising, prior to said step of bonding and pressing, the steps of scattering a number of spacers coated with an adhesive on said first substrate and bonding said spacers to said first substrate without bonding said spacers to said second substrate.

9. The method according to claim 8, wherein said liquid crystal is a ferroelectric liquid crystal.

10. The method according to claim 8, wherein said given amount of said liquid crystal is 1% to 3% less than a product of an area inside said sealant and a diameter of said spacers.

11. The method according to claim 10, wherein said liquid crystal is a ferroelectric liquid crystal.

12. The method according to claim 10, wherein said first substrate comprises a glass plate whereas said second substrate comprises a plastic resin film, wherein said first substrate is placed on said second substrate via said sealant within said vacuum chamber, and wherein a pressure is applied to said first substrate radially outwardly from a central portion thereof by an elastic member.

13. The method according to claim 12, wherein said liquid crystal is a ferroelectric liquid crystal.

14. The method according to claim 7, wherein said liquid crystal is a ferroelectric liquid crystal.

* * * * *